F. L. HAYES.

SHOE.

APPLICATION FILED AUG. 20, 1919.

Reissued Oct. 28, 1919. 14,744.

Witness

Inventor

Fred L. Hayes

By Louis Bagger & Co his Attorneys

UNITED STATES PATENT OFFICE.

FRED L. HAYES, OF ROCKLAND, MASSACHUSETTS.

SHOE.

14,744. Specification of Reissued Letters Patent. Reissued Oct. 28, 1919.

Original No. 1,263,318, dated April 16, 1918, Serial No. 173,126, filed June 6, 1917. Application for reissue filed August 20, 1919. Serial No. 318,814.

*To all whom it may concern:*

Be it known that I, FRED L. HAYES, a citizen of the United States, residing at Rockland, county of Plymouth, and State of Massachusetts, have invented an Improvement in Shoes, of which the following is a specification.

My invention relates to an improvement in shoes, and appertains more particularly to a shoe which utilizes two pieces of material in the vamp in the place of the one continous strip hitherto in use. An object of my invention is to provide such a shoe in which a reinforcing member extends across the joint at the intersection of two pieces of material in the vamp from the toe-cap to the tongue.

A further object of my invention is to provide a construction which utilizes portions of leather that might otherwise be waste, and which utilization results in a more attractive product than has heretofore been attained.

In the accompanying drawings, forming a part of this specification:—

Figure 1:
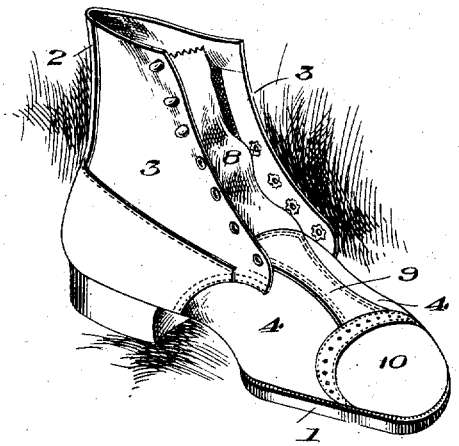
Figure 1 is a perspective view of my shoe.
Figure 2:
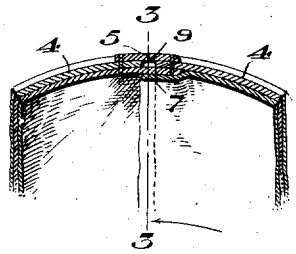
Fig. 2 is a vertical section through the vamp thereof.
Figure 3:
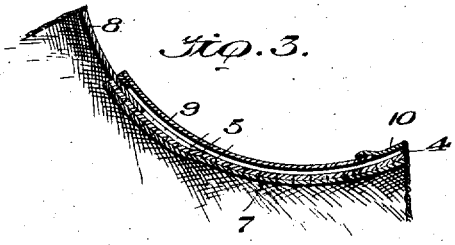
Fig. 3 is a longitudinal section through the vamp.

The usual sole 1 is provided with the customary back-stay 2, and uppers 3, 3. The vamp, however, differs from the usual form, inasmuch as it consists of two halves 4, 4, fastened to the sole 1 at the bottom, and being sewed together at 5. The vamp-lining is similarly divided and sewed together along the seam 7. The tongue 8 is anchored securely between the vamp-lining and the vamp, and an overlay 9 extends from the tongue joint to the end of the joint between the sections of the vamp. It is securely sewed in place and forms a strong reinforcing binder for the vamp and connects the tongue and the toe-cap 10 in a substantial manner.

The advantages of such a construction are obvious, particularly in boys', misses' and children's shoes, which frequently tear at the vamp, which my invention precludes.

By my invention, a shoe-maker is enabled to utilize scraps of leather, which might otherwise be waste material, in the formation of the vamp-sections, and that enables him to use an ornamented overlay for the purpose, which improves the appearance of the shoe in a marked degree.

I claim:

1. A shoe upper containing quarters seamed at the back, a vamp consisting of two halves made of small pieces of leather joined together approximately at the center and extending approximately to the middle of the instep where they meet the quarters, an overlay extending over said seam and stitched over the two halves of the vamp, and a toe-cap stitched over the forward edges of the two halves of the vamp and the overlay.

2. A shoe comprising a sole, two quarters, a toe, a vamp made of two sections joined together by a seam at the front of the shoe, a vamp lining, a tongue and an overlay for said seam extending from the tongue to the end of the vamp section and beneath said toe cap, said overlay and tongue adapted to receive therebetween at the upper end the meeting edges of the vamp section, and the several elements securely stitched together, the overlay being of such a width with relation to the seam connecting the vamp section as to relieve the vamp portions of any undue strain by pulling upon the tongue.

In testimony whereof I affix my signature.

FRED L. HAYES.

Copies of this patent may be obtained for five cents each, by addressing the "Commissioner of Patents, Washington, D. C."